(12) United States Patent
Clai

(10) Patent No.: US 6,487,947 B1
(45) Date of Patent: Dec. 3, 2002

(54) DEVICE FOR REAMING PIPE

(76) Inventor: Steven M. Clai, 14N875 Whispering Trail, Hampshire, IL (US) 60140

( * ) Notice: Subject to any disclaimer, the term of this patent is extended or adjusted under 35 U.S.C. 154(b) by 77 days.

(21) Appl. No.: 09/648,571

(22) Filed: Aug. 25, 2000

(51) Int. Cl.[7] .................................. B23B 5/16
(52) U.S. Cl. ........................ 82/113; 82/128; 82/53; 408/206
(58) Field of Search .................... 82/113, 53, 128; 407/53, 54, 55; 408/206, 207, 208, 218, 713

(56) References Cited

U.S. PATENT DOCUMENTS

| 469,057 | A | * | 2/1892 | Chesnut | 408/207 |
|---|---|---|---|---|---|
| 550,190 | A | * | 11/1895 | Myers | 408/207 |
| 1,164,659 | A | * | 12/1915 | Moore et al. | 144/24.12 |
| 3,645,640 | A | | 2/1972 | Zukas | |
| 3,659,482 | A | | 5/1972 | Blake | |
| 3,817,649 | A | | 6/1974 | Medney | |
| 4,197,042 | A | | 4/1980 | Krhounek et al. | |
| 4,483,222 | A | | 11/1984 | Davis | |
| 4,611,358 | A | | 9/1986 | Mills et al. | |
| 4,799,409 | A | | 1/1989 | Ricci | |
| 4,930,946 | A | | 6/1990 | Phillips, Sr. | |
| 5,180,260 | A | | 1/1993 | Phillips, Sr. | |
| 5,314,270 | A | | 5/1994 | Lavancy et al. | |
| 5,915,893 | A | | 6/1999 | Miyanaga | |
| 5,938,379 | A | | 8/1999 | Tseng | |
| 5,947,655 | A | | 9/1999 | Ramsey | |
| 5,964,655 | A | | 10/1999 | Tseng | |
| 6,322,296 | B1 | * | 11/2001 | Wetli et al. | 407/42 |

* cited by examiner

Primary Examiner—Henry Tsai

(57) ABSTRACT

A reaming device for reaming a pipe, which may have electrical wires passed therethrough, is attachable to a power tool, has at least one reaming blade thereon, and is adapted to receive at least one driving bit.

18 Claims, 2 Drawing Sheets

DEVICE FOR REAMING PIPE

This invention relates to a device for reaming pipe and more particularly to a device as an attachment for a power drill or similar device to be used to ream a pipe and drive a screw or other fastener, especially in order to assist with an electrical wiring installation.

BACKGROUND OF THE INVENTION

In any field wherein metal pipe is used, it is necessary to cut and bend, and then shape the pipe to its desired use. This is especially true in the field of electrical installations. Cutting of the pipe can and does result in a rough end of the pipe.

Unfortunately, in the electrical fields, it is critical to have the end of the pipe smooth. This smooth end minimizes damage to the wire as the assembly is being completed and simplifies the installation of the electrical circuits. Also, the smooth end makes it easier to install a conduit fitting, a coupler or a connector.

This smooth end is especially desirable for electrometallic tubing, called EMT in the trade. While this tubing has a thin wall, it is still desirable and required to provide a smooth end after cutting the same in order for the pipe to fit into the circuit.

By reaming the end of the cut pipe, it becomes smooth. With the end of the pipe being smooth, the pipe is less likely to snag or damage the insulation on the wire or wires passed therethrough. Such reaming currently is accomplished by hand tools. Power tools are not adaptable for this purpose.

However, the only adequate way to ream a pipe at this time is by hand. This reaming of the pipe is accomplished by using a channel lock and a screw driver. With these tools, great physical and repetitive effort is required from the electrician, in order to complete the required work.

Such a repetitive use of the hands with these tools can result in a severe case of carpal tunnel syndrome or other pain causing factors. Not only does such pain interfere with an electrician's ability to perform the required duties, it might even prevent the electrician from working at all. Thus, if a device can be developed to more efficiently ream the pipe, great advantages are obtained.

One manner of efficient reaming is with a power tool. However, it is difficult to achieve a power assisted reamer and still obtain efficient reaming of a pipe, especially a pipe used for an electric circuit. The flexibility of the reaming tool can be lost with a power-assisted device. The difficulty of switching tools and the ability to combine the functions of the channel locks and the screw driver in one tool is difficult, especially when the power-assisted function is added to the equation.

Furthermore, in the electrical industry, it is difficult to use a power tool to drive a screw, in order to secure tubing or pipes in position. Thus, if a power tool is used, great care with screw fasteners for the tubing is required.

Thus, the desirability of power reaming can be outweighed by the necessity of efficiently switching tools being used. If the power tool cannot switch easily, the desired results simplifying the work cannot be accomplished.

SUMMARY OF THE INVENTION

Among the many objectives of this invention is the provision of an attachment for a power tool capable of reaming a pipe and driving a screw.

A further objective of this invention is the provision of an attachment for a power tool capable of reducing carpel tunnel syndrome.

Yet a further objective of this invention is the provision of an attachment for a power tool capable of use with a power drill.

A still further objective of this invention is the provision of an attachment for a power tool capable of reducing the need for channel locks in electrical work.

Another objective of this invention is the provision of an attachment for a power tool capable of replacing a hand screw driver.

Yet another objective of this invention is the provision of an attachment for a power tool capable minimizing damage to wire insulation.

Still, another objective of this invention is the provision of an attachment for a power tool capable of simplifying the installment of electrical wires.

Also, an objective of this invention is the provision of a power-assisted method for reaming a pipe.

A further objective of this invention is the provision of an attachment for a power tool capable of reaming a pipe.

Yet a further objective of this invention is the provision of an attachment for screw driver bit.

A still further objective of this invention is the provision of an attachment for increasing the efficiency of an electrician.

These and other objectives of the invention (which other objectives become clear by consideration of the specification, claims and drawings as a whole) are met by providing a method and device for reaming a pipe, which may have electrical wires passed therethrough, by providing a device attachable to a power tool with at least one reaming blade thereon, and adapted to receive at least one driving bit.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

A pipe reamer for reaming the pipe includes a stepped body having blades mounted on each step. Each blade is adapted to ream a pipe of a different diameter. The steps can be adjusted to the appropriate sizes of pipe. Pipe or tube may be used interchangeably herein. In a preferred form, three steps are permitted on the stepped body, thereby permitting three of the most common diameters of pipe to be serviced with one attachment.

The blade can be held in place in any suitable fashion. Within the stepped body is a blade slot. Placed in the blade slot and secured therein is a reaming blade. On the reaming blade are preferably three cutting edges, each of which may handle a different diameter of pipe. While treating for three diameters of pipe is depicted, more or less may be used if desired, with the appropriate blade adjustment and stepped body adaptation.

Usually, the preferred method of locking the blade in the body is a screw clamp mechanism. The fasteners for this screw clamp mechanism may be any suitable fastener or fasteners. Preferably, a pair of fasteners provides a margin of safety. Typical fasteners include, but are not limited to, a lock pin and an Allen set screw.

Within the stepped housing, is a bit receiver. This bit receiver permits any type of bit to be inserted for use as a screw driver. The driving end is received into a cordless or cord having drill. As the bit is placed in the drill, the reamer is placed in the pipe, the drill is activated, and the ends of the pipe are reamed appropriately. When desired, a bit may be inserted in the tube and locked therein by a magnetic force or other suitable force. The bit may then be used to finish the matter. Clearly a cordless or other power tool may be used.

Any number of tips may be used instead of a screw driver. Such tips include, but are not limited to a star tip, an Allen tip, a square tip, a socket drive tip, a Phillips tip, a blade tip, or a scribe tip.

Figure 1:
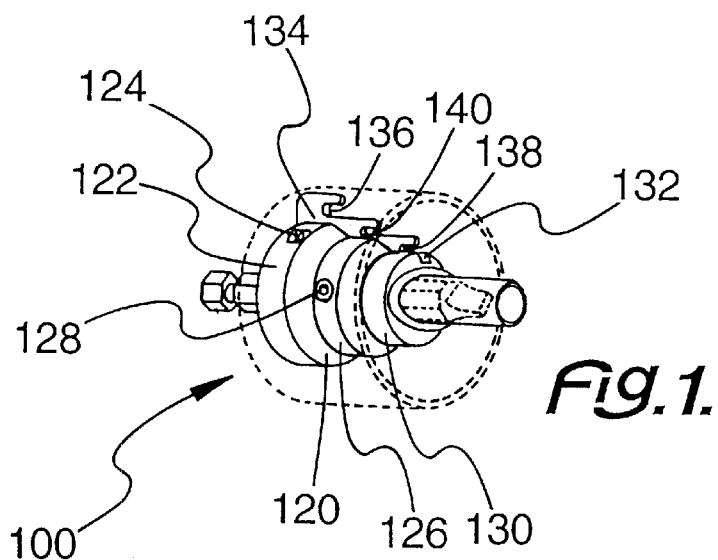
FIG. 1 depicts a perspective view of the device for reaming pipe of this invention in form of attachment 100.

Referring now to FIG. 1, power tool attachment 100 includes a housing in the form of a tool body 120. The tool body 120 includes a series of three steps. In the largest diameter step 122, is provided a lock pin 124. In the second step 126, is provided an Allen set screw 128. Smallest diameter step 130 completes tool body 120. While lock pin 124 and Allen set screw 128, are the preferred fasteners, other fasteners may also be used.

Sleeve 158 both slides and fits over hex drive extension 156. Both sleeve 158 and hex drive extension 156 insert through aperture 121 of tool body 120, leaving hex shank 155 exposed for coupling to drill 108. The Allen set screw 128 secures sleeve 158 and hex drive extension 156 to tool body 120, through body threaded aperture 118, which is on opposite sides of the step 126 of tool body 120, relative to lock pin 124. Lock pin 124 fits into recessed aperture 125, of tool body 120 and through blade aperture 135 of blade 134, as assembled.

The three-stage reaming blade 134 serves to ream the pipe 110 (shown in FIG. 2), as desired, depending on the diameter of pipe 110. The three stage reaming blade 134 has, in one unit, a large cutting blade 136, and a small cutting blade 138. Situated therebetween is a medium cutting blade 140. Thus, the reaming blade 134 may be used on three different diameters of pipe 110.

Figure 2:
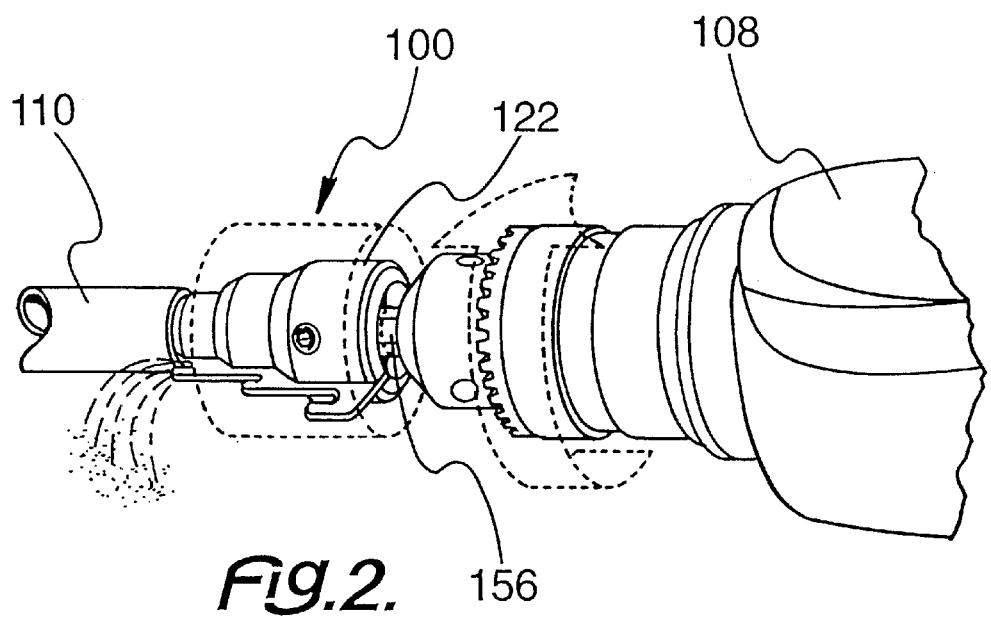
FIG. 2 depicts a perspective view of attachment 100, in use for reaming a pipe 110.

Adding FIG. 2 to the consideration, the hex drive extension 156 can be received in the power drill 108. From the tool body 122, extends a hex drive extension 156. The hex drive extension 156 can be received into a power drill 108. The steps permit the reaming tool or attachment 100 to adjust to three different diameters of pipe 110.

Figure 3:
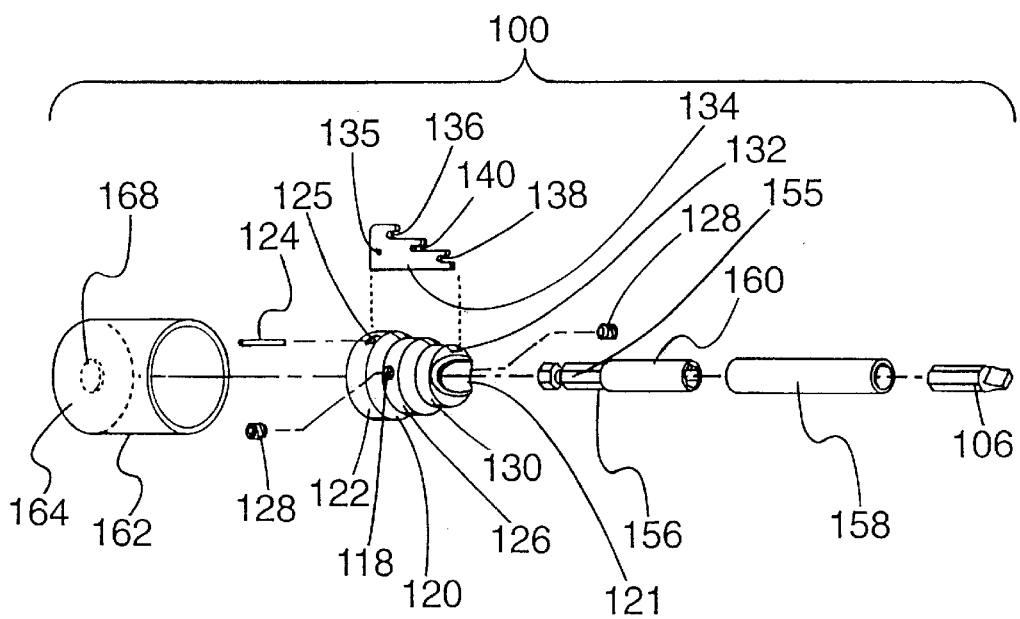
FIG. 3 depicts an exploded, perspective view of attachment 100.

Now including FIG. 3 in the consideration, oppositely disposed from the hex drive extension 156 and extending from the smallest step 130 of the tool body is a sleeve 158. Into the sleeve 158 may be fitted a bit 106, which will mesh into hex drive extension 156. Sleeve 158 may have a magnetized base 160 in order to hold bit 106 in sleeve 158. Hex drive extension 156 additionally provides support for the bit 106, and makes use of the bit 106 much safer.

Figure 4:
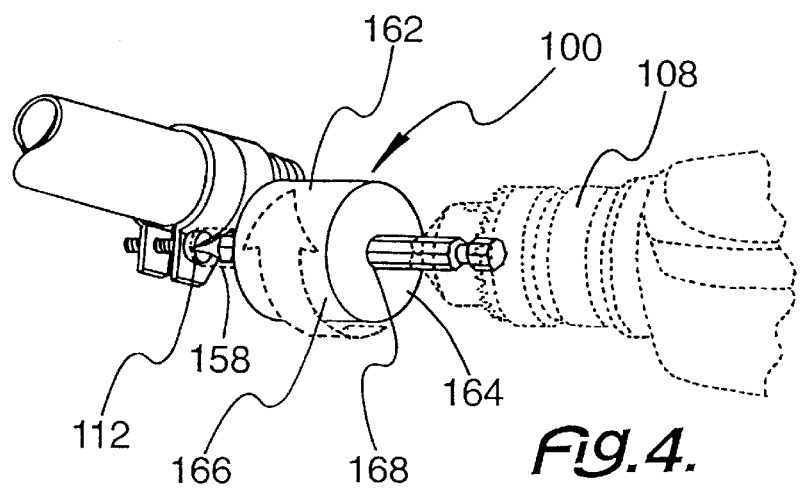
FIG. 4 depicts a perspective view of attachment 100, in use for driving a screw 112.

With FIG. 4, the function of sleeve 158 (shown in phantom) in supporting bit 106 in order to drive fastening screw 112 is shown. Over bit 106 and three stage reaming blade 134 may fit safety shield 162. Safety shield 162 permits using attachment 100, while shielding the user from the fast-moving blades of three stage reaming blade 134.

While safety shield 162 is shown as having base 164 perpendicular to circular side 166, shield base 164 may have a tapered angle relative to circular side 166. Shield base 164, of course, includes base aperture 168 to permit mounting of safety shield 162. The perpendicular or right angle is preferred in order to trap most trimmed particles therein.

While the structure of the attachment 100 is depicted, it is possible combine two or more parts in one part, by providing an appropriate machining process. Thus, the assembly of attachment 100 can be accomplished as desired.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A device for reaming a pipe comprising:
   (a) a body supporting a reaming blade in order to form the device;
   (b) the reaming blade being secured to the body;
   (c) a power tool receiver being situated at a first end of the body;
   (d) a bit receiver being situated at a second end of the body;
   (e) the first end of the body being oppositely disposed from the second end of the body;
   (f) the body including a blade slot;
   (g) the reaming blade being received in the blade slot and secured to the body;
   (h) at least one fastening means securing the reaming blade in the blade slot;
   (i) the bit receiver for engaging a driving bit and including a bit sleeve positioned around the bit and receiver; and
   (j) the bit sleeve and bit receiver being adapted to guidedly drive a screw.

2. The device of claim 1 further comprising:
   (a) the body having a first step, a second step, and a third step;
   (b) the first step, the second step, and the third step each being adapted to a different diameter of the pipe; and
   (c) the reaming blade being adapted to ream the different diameter of the pipe.

3. The device of claim 2 further comprising:
   (a) the reaming blade having a first blade, a second blade, and a third blade;
   (b) the first blade cooperating with the first step;
   (c) the second blade cooperating with the second step;
   (d) the third blade cooperating with the third step;
   (e) the first blade being adapted to ream a largest diameter of the pipe;
   (f) the second blade being adapted to ream a larger diameter of the pipe; and
   (g) the third blade being adapted to ream a large diameter of the pipe.

4. The device of claim 3 further comprising:
   (a) the at least one fastening means being at least one fastener selected from the group consisting of a lock pin and an Allen screw;

(b) the bit receiver accepting a bit selected from the group consisting of an Allen bit, a Phillips bit, a torque bit, a flat bit and a socket bit.

5. The device of claim 4 further comprising:
   (a) the body being cylindrical in shape;
   (b) the third step being adjacent to the bit receiver; and
   (c) the first step being adjacent to the power tool receiver.

6. The device of claim 5 further comprising:
   (a) the bit receiver including a magnetic base in order to hold the bit therein;
   (b) the fastener including the lock pin mounted in the first step; and
   (c) the fastener including the Allen screw mounted in the second step.

7. The device of claim 6 further comprising:
   (a) a safety shield being mounted on the device; and
   (b) the safety shield being adapted to protect a user from the reaming blade.

8. The device of claim 7 further comprising:
   (a) the safety shield having a shield base and a shield side;
   (b) the shield base including a base aperture to receive the device; and
   (c) the shield side and the shield base being in a right angle relationship.

9. The device of claim 8 further comprising the shield side being a cylinder.

10. The device of claim 7 further comprising:
    (a) the safety shield having a shield base and a shield side;
    (b) the shield base including a base aperture to receive the device; and
    (c) the shield side and the shield side being in an obtuse angle relationship.

11. The device of claim 10 further comprising the shield side being a cylinder.

12. A device for reaming a pipe comprising:
    (a) a body supporting a reaming blade in order to form the device;
    (b) the reaming blade being secured to the body;
    (c) a power tool receiver being situated at a first end of the body;
    (d) a bit receiver being situated at a second end of the body;
    (e) a safety shield covering the body;
    (f) the first end of the body being oppositely disposed from the second end of the body
    (g) the body including a blade slot;
    (h) the reaming blade being received in the blade slot;
    (i) at least one fastening means securing the reaming blade in the blade slot;
    (j) the bit receiver for engaging a driving bit and including a bit sleeve positioned around the bit and receiver;
    (k) the bit sleeve and bit receiver being adapted to guidedly drive a screw;
    (l) the body having a first step, a second step, and a third step;
    (m) the first step, the second step, and the third step each being adapted to a different diameter of the pipe; and
    (n) the reaming blade being adapted to ream the different diameter of the pipe.

13. The device of claim 12 further comprising:
    (a) the reaming blade having a first blade, a second blade, and a third blade;
    (b) the first blade cooperating with the first step;
    (c) the second blade cooperating with the second step;
    (d) the third blade cooperating with the third step;
    (e) the first blade being adapted to ream a largest diameter of the pipe;
    (f) the second blade being adapted to ream a larger diameter of the pipe;
    (g) the third blade being adapted to ream a large diameter of the pipe;
    (h) the at least one fastening means being at least one fastener selected from the group consisting of a lock pin and an Allen screw;
    (i) the bit receiver accepting a bit selected from the group consisting of an Allen bit, a Phillips bit, a torque bit, a flat bit and a socket bit;
    (j) the body being cylindrical in shape;
    (k) the third step being adjacent to the bit receiver;
    (l) the first step being adjacent to the power tool receiver; and
    (m) the first blade, the second blade and the third blade being adapted to render an end of a pipe smooth.

14. The device of claim 13 further comprising:
    (a) the bit receiver including a magnetic base in order to hold the bit therein;
    (b) the fastener including the lock pin mounted in the first step;
    (c) the fastener including the Allen screw mounted in the second step; and
    (d) the safety shield being adapted to protect a user from the reaming blade.

15. The device of claim 14 further comprising:
    (a) the safety shield having a shield base and a shield side;
    (b) the shield base including a base aperture to receive the device; and
    (c) the shield side and the shield side being in a right angle relationship.

16. The device of claim 15 further comprising the shield side being a cylinder.

17. The device of claim 14 further comprising:
    (a) the safety shield having a shield base and a shield side;
    (b) the shield base including a base aperture to receive the device; and
    (c) the shield side and the shield side being in an obtuse angle relationship.

18. The device of claim 17 further comprising the shield side being a cylinder.

* * * * *